N. W. AKIMOFF.
METHOD OF AND APPARATUS FOR DETECTING DYNAMIC BALANCE.
APPLICATION FILED JUNE 26, 1915.
1,262,593.  Patented Apr. 9, 1918.
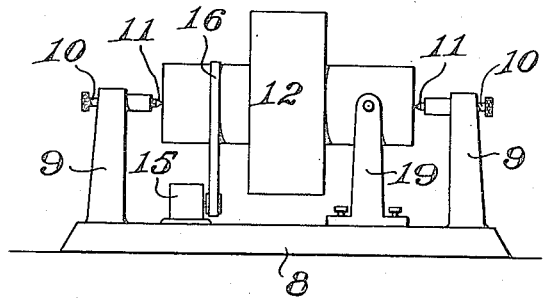
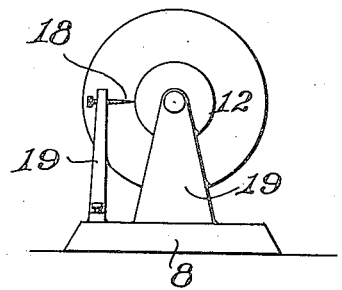
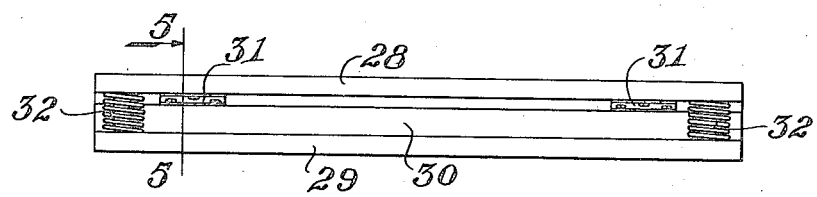
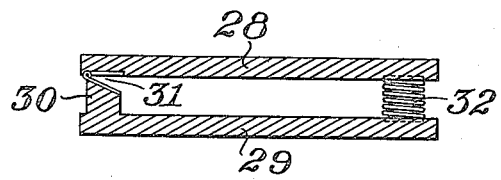
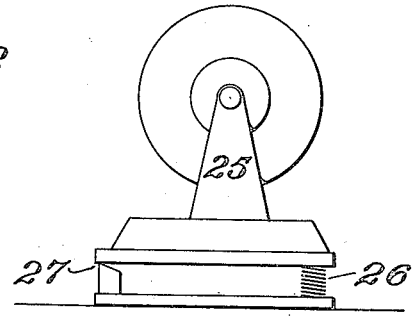
Witnesses
W. O. Freeman,
C. B. Barnes.
Inventor
Nicholas W. Akimoff,
By J. Stuart Freeman,
Attorney

UNITED STATES PATENT OFFICE.

NICHOLAS W. AKIMOFF, OF PHILADELPHIA, PENNSYLVANIA, ASSIGNOR, BY MESNE ASSIGNMENTS, TO DYNAMIC BALANCING MACHINE COMPANY, OF PHILADELPHIA, PENNSYLVANIA, A CORPORATION OF PENNSYLVANIA.

METHOD OF AND APPARATUS FOR DETECTING DYNAMIC BALANCE.

1,262,593.  Specification of Letters Patent.  Patented Apr. 9, 1918.

Application filed June 26, 1915. Serial No. 36,573.

*To all whom it may concern:*

Be it known that I, NICHOLAS W. AKIMOFF, a subject of the Czar of Russia, and a resident of the city of Philadelphia, county of Philadelphia, and State of Pennsylvania, U. S. A., have invented certain new and useful Improvements in the Methods of and Apparatus for Detecting Dynamic Balance, of which the following is a full, clear, and exact description.

The object of the invention is to provide an improved method of, and apparatus for, detecting the fact of the unbalanced condition of a revolving body.

The necessity of a perfect running, or dynamic, balance in bodies designed to revolve at high speeds is well known to all of those familiar with the art of perfect rotating bodies, which requires a condition in which the principal axis of inertia of a body is coincident with its axis of rotation.

This invention deals not with the method of, and apparatus for, obtaining a perfect balance of an unbalanced rotatable body, but relates directly to means for indicating the fact of the body's unbalanced condition. If the lack of balance is great, there is no especial need for means to indicate the same, as the foundations, upon which the body is mounted, have imparted to them the vibration of the body, when running at high speeds, and thus clearly give evidence of this fact.

However, when a body is not unbalanced to a considerable degree, or when it is desired to ascertain the condition of balance of a body rotatable at relatively low speeds, say 400 R. P. M., as contrasted with those intended to revolve at several thousand revolutions per minute and again when an absolutely perfect balanced condition is required, far below the degree at which every known balancing indicator operates authoritatively, the present invention positively apprises the operator of the balanced condition of his rotatable body, substantially all frictional resistance to its operation being eliminated, as well as exaggerated lack of balance due to distortion at high speeds caused by centrifugal force.

By the usual method of determining a condition of unbalance, a scriber, pointer, or other indicator, is in every instance mounted upon a foundation, which is either identical with, or adjacent to, the foundation upon which the unbalanced body is rotating. Needless to say, several methods have been devised for isolating the scribe, or pointer, from subjection to the disturbing effects of the vibrating body, but in every case the success attained has been but partial and wholly unsatisfactory for accurate work. As a result, the mounting of the scriber or pointer assumes a vibration to a greater or less degree in synchronism with that of the revolving body, and being uncertain and irregular in its action with respect to the movement of said body, is undependable even in consistently giving the same relative indication, regardless of the speed of rotation of the body, as the phase difference objectionable in itself does not remain constant which makes the matter worse.

Were the vibration of the pointer or scriber mounting to always act in the same way with a constant phase difference, it would be possible with a certain degree of ensuing accuracy to reverse the direction of rotation, note the centers of the scriber marks, and then take the mean between them, this being on the assumption that the scriber marks the same distance in advance, or to the rear, of the "high point" on the body when revolving in both directions. But, this not being the case, this method is impracticable for very accurate work, and it therefore follows that the only accurate way is to design the foundation of the balancing machine in such manner that it will positively vibrate in resonance with, and as soon as, an unbalanced body is brought to a given predetermined speed of rotation, which for practical purposes may be quite low, in fact much lower than at which the body is intended to run; for if a condition of unbalance manifests itself at such low speed, and the body is then accurately balanced for that speed, it is quite evident that the said body will be balanced for all higher speeds.

With the employment of this method the use of an indicating pointer is eliminated and the machine intended to finally balance the rotatable body can be directly mounted in intimate association with such resilient means as may be employed, a great variety of these being available for the purpose. In this case, the resilient means, such for instance as one or more coil springs, is designed to possess a given natural frequency of vibration under a given load, and said means may either be adjustable, or interchangeable springs each having a known degree of elasticity may be employed. Then, if the body revolving in association with such spring, or springs, is lacking to any degree the most perfect balance, as the speed of said body is brought into synchronism with the known natural frequency of vibration of said spring, or springs, the latter, together with any mechanism that may be mounted thereon, will immediately commence to vibrate too, the intensity of the same being only dependent upon the speed of rotation, and the same also acting to magnify for observation purposes the vibration actually caused by the unbalanced body.

Therefore, the present invention in a few words involves the method of magnifying the disturbance, or the amplitude of the vibrations, resulting from the unbalanced condition of a rotatable body by the association therewith of one or more adjustable, or interchangeable, resilient means, having known, predetermined frequencies of vibration under a given load, or being tuned to synchronism with the period of natural vibration of said body.

A further object is to provide a simple and efficient apparatus for use, either alone, or in conjunction with any known apparatus for obtaining the dynamic balance of a rotatable body.

And a still further object is to provide a yielding support for a rotatable body, said support being operative to vibrate in accordance with said body when the latter is unbalanced, and interchangeable, resilient means, on which said support is mounted, operative to respond to the vibrations of said body when said vibrations are in synchronism with the natural period of vibration of said means.

These and other objects and details of the invention in its preferred embodiment are fully and clearly brought out in the following description when read in conjunction with the accompanying drawings, in which Figure 1 is a side elevation of a simple device illustrating the scriber method of indicating a lack of dynamic balance; Fig. 2 is an end elevation of the same; Fig. 3 is a schematic end elevation of a simple mounting for a rotatable body supported by a yieldingly mounted platform; Fig. 4 is a front elevation of one form of the resiliently mounted platform shown in Fig. 3; and Fig. 5 is a section on the line 5—5 of Fig. 4.

Referring to Figs. 1 and 2 of the drawings, a simple form of mechanism employing the scriber method of indicating a lack of dynamic balance is shown as comprising a frame, in turn comprising a base 8, upright bearing supports 9, through which are laterally yielding, adjustable, reciprocable members 10, to which are secured dead centers, or pivot center bearings 11, between and upon which is mounted to revolve the representative rotatable body 12.

Also secured to the frame base 8 is a suitable actuating mechanism 15, such as an electric motor, the same being operative to drive the body 12 by means of a suitable belt 16. A longitudinally adjustable scriber 18 is carried by an adjustable upright support 19, mounted upon the base of the frame, and said scriber is so positioned, that if the rotating body vibrates upon the yielding centers 10, it moves laterally during each revolution until at a certain position one point on its periphery comes into engagement with the said scriber, which makes a scratch upon the surface thereof.

However, although mounted with respect to the upright supports upon which the body is revolving as rigidly as it is possible to make it, and although the natural period of vibration of the scriber support is out of phase and therefore not in synchronism with the speed of the said body, it will in time answer irregularly to the vibrations of the body and make it absolutely impossible to depend upon the scriber marks said marks being to the rear of the "high point", and in the case in which the natural period of vibration of the scriber support is identical with vibration of the body, but with a lag in phase of 180 degrees, the relative movement between the scriber and the body, causing the marks which the former is supposed to make upon the latter, is nullified, and the purpose of the device is destroyed.

With these facts in mind the principle shown diagrammatically in Fig. 3 has been developed, in which case a machine 25 of the type for obtaining a dynamic balance is mounted in association with, or directly upon, one or more yielding means 26, such as coil springs, the natural period of vibration of which is previously placed at a given quantity, one side of said machine base, or the platform directly thereunder, being preferably pivoted as at 27, to limit the vibrations of the system to a given direction.

Referring to Figs. 4 and 5 the details of one form of construction embodying this invention are shown as comprising upper and lower, normally substantially parallel plates 28 and 29, the lower of which is provided with an upwardly projecting portion 30, to which is secured in any desired manner a suitable hinge 31, also secured to the upper plate 28. The opposite edge portions of said plates are normally spaced apart by resilient members 32, preferably in the form of coil springs, which are of a definite predetermined period of natural vibration under a given load, and interchangeable with others having other known periods of vibration under a given load.

In the operation of this method with the apparatus shown, no scriber or oscillating pointer is necessary to indicate the lack of dynamic balance. And in order to remedy a condition of unbalance, if such is found to exist in a rotating body, any one of several means can be used, among others those of mostly cut-and-try nature with which, however, we are not concerned in this description, which relates more particularly to the method of ascertaining the very presence of such unbalanced condition.

As a specific instance, consider the case of an unbalanced crank-shaft for an automobile engine. Such a body is generally designed to revolve at a maximum speed which varies in the neighborhood of 1200 R. P. M. to 1500 R. P. M. By the above method, it is only necessary, however, to revolve the shaft at a relatively low rate of speed, as for instance 300 R. P. M., at which rate the mechanism associated with the body will be vibrated violently as a result of a slight unbalanced condition, the natural period of vibration of the supporting springs being purposely designed to respond to that speed.

This speed identical with the rate of natural vibrations of the springs, is commonly known as the synchronizing speed and, as stated, need not necessarily be very high. It is also referred to at times as the critical speed, which name however, is misleading, as it tends to impart the idea that something is threatening or dangerous for the machine and possibly for the operator. Also, it is sometimes thought to be a characteristic of the body, whereas it really depends upon and varies with the nature of the supports.

Instead of mounting the machine as shown in the drawings, it can be mounted upon any desired number of springs, or suspended by the same, but in any case the principle of resonance or forced vibrations is employed. So far as is known, as soon as such a condition has begun to exist in a machine, that is when the foundations began to vibrate in coincidence with the rate of rotation of the revolving unbalanced body, it has always been considered advisable to depart as quickly as possible from that condition, owing probably to a lack of a true understanding of the nature and possibilities of such an action. But in this invention it is the adaption and use of this board physical law to determine more accurately than heretofore the presence or absence of a necessary mechanical balanced condition.

Having thus described my invention, what I claim and desire to protect by Letters Patent of the United States is:—

1. The method of determining the condition of balance of a rotatable body, by revolving the same at a convenient velocity, supported by interchangeable yielding means having known natural periods of vibration under a given load substantially resonant with the vibrations of said body.

2. The method of determining the condition of balance of a rotatable body, by revolving the same at a convenient velocity, supported by interchangeable yielding means, and bringing the natural period of vibration of said means into substantial resonance with the vibration of said body.

3. The method of determining the condition of balance of a rotatable body, by revolving the same at a convenient velocity upon a device supported by yielding means, the device adapted to assume different natural periods of vibration corresponding with changes in said yielding means, and adjusting the latter to bring the natural period of vibration of said device to substantial resonance with the vibrations of said body.

4. The combination of a dynamic balancing machine, with a yielding support, comprising interchangeable resilient means adapted to alter the natural period of vibration of said support to substantially coincide with the vibration caused by a given velocity of said machine.

5. The combination of a dynamic balancing machine, with a yielding support, comprising interchangeable resilient means having predetermined natural periods of vibration under a given load.

6. The combination of a dynamic balancing machine, with a yielding support therefor, said support being restrained to vibrate in a given plane, and comprising interchangeable resilient means adapted to change the natural period of vibration of said support to substantial resonance with the vibration of said machine.

7. The combination of a dynamic balancing machine, with a yielding support, restrained to vibrate in a given plane, and comprising a resilient means interchangeable with others and all having a predetermined natural period of vibration under given loads operative to alter the natural period of vibration of said support to substantial resonance with a vibration of said machine.

In witness whereof, I hereunto set my hand this 25th day of June, 1915.

NICHOLAS W. AKIMOFF.

Witnesses:
N. O. FREEMAN,
J. STUART FREEMAN.